United States Patent [19]

Placzek

[11] Patent Number: 4,974,781
[45] Date of Patent: Dec. 4, 1990

[54] METHOD AND APPARATUS FOR PREPARING PAPER-CONTAINING AND PLASTIC-CONTAINING WASTE MATERIALS FOR COMPONENT FRACTION SEPARATION

[75] Inventor: Terrance M. Placzek, Hallam, Nebr.

[73] Assignee: The Placzek Family Trust, Tickfaw, La.

[21] Appl. No.: 321,563

[22] Filed: Mar. 9, 1989

[51] Int. Cl.$^5$ .............................................. B02C 19/12
[52] U.S. Cl. ........................................ 241/17; 241/21; 241/23; 241/24; 241/26; 241/65; 241/284; 241/DIG. 38
[58] Field of Search .................... 209/930, 687, 690; 366/227, 228; 241/299, 26, 24, 284, 74, 65, DIG. 38, 23, 20, 41, 17, 21

[56] References Cited

U.S. PATENT DOCUMENTS

| | | | |
|---|---|---|---|
| 3,993,252 | 11/1976 | Ito et al. | 241/DIG. 38 X |
| 4,342,830 | 8/1982 | Holloway . | |
| 4,533,054 | 8/1985 | Sommer et al. | 209/930 X |
| 4,540,495 | 9/1985 | Holloway . | |
| 4,844,351 | 7/1989 | Holloway | 241/DIG. 38 |

FOREIGN PATENT DOCUMENTS 1151292  4/1985  U.S.S.R. .............................. 241/299

*Primary Examiner*—Mark Rosenbaum
*Attorney, Agent, or Firm*—Julian C. Renfro

[57] ABSTRACT

This invention relates to an improved method and apparatus to effect the separation of component fractions from paper-containing and plastic-containing waste materials. This method and apparatus accepts materials of widely varying characteristics such as paper, plastics, glass, metal, food wastes and other materials to be inserted en masse into a rotating vessel equipped with lifting paddles and directional flighting. In this way the intimate contact of materials with moisture and heat is accomplished, thus effecting the repulping of paper materials. The repulped materials, as a result of directional tumbling, are dispersed throughout the vessel. Because of the repulping of the pulpable materials, size reduction of the randomly large and odd-shaped pulpable material is accomplished. By virtue of the size reduction of the large and odd-shaped pulpable materials, the non-pulpable components are freed of the particle shapes and surfaces that affect separation. The repulping of the pulpable materials increases the bulk density of those materials, further enhancing their separation from the additional components. The recovered pulped product is suitable for recycling into the paper industry; for combustion as a high quality fuel or for use as a feedstock for conversion into chemicals. The recovered non-pulpable materials such as plastics, glass, metals, aluminum and other materials are suitable for recycling into their producer industries; as feedstock raw materials for additional manufacturing of products; or any or all of these materials can be disposed of in a sanitary landfill as is the commonly accepted practice.

27 Claims, 5 Drawing Sheets

METHOD AND APPARATUS FOR PREPARING PAPER-CONTAINING AND PLASTIC-CONTAINING WASTE MATERIALS FOR COMPONENT FRACTION SEPARATION

BACKGROUND OF THE INVENTION

Waste paper has for many years been recycled and utilized as a source of feedstock for the manufacture of paper products. The availability of recycled paper, however, is subject to the economics of the recovery, sorting and cleaning of the waste paper from the waste paper containing materials. The recovery, sorting and cleaning of waste paper for recycling has, therefore, had such implications as requiring voluntary sorting of the paper at the source of generation, which requires special handling by the generator; dedicated pickup of specially segregated materials by a recycler; and component separation by the recycler after collection.

Waste plastics have become increasingly important because of their very long term resistance to degradation and decomposition in the environment and because of the hazardous nature of the gaseous compounds that are produced when plastics are incinerated. Recycling of these plastics has begun, but only slowly and only certain plastics are specifically separated from the waste stream. Because of the increasing problem of waste plastics, it is being considered that plastic packaging be limited or even banned. The recovery, sorting and cleaning of waste plastics for recycling has therefore, as with waste paper, had such implications as requiring voluntary sorting of the plastic at the source of generation and dedicated pickup of specific plastics by a recycler to be viable as a source of plastic to be utilized by the plastics industry.

It has long been recognized that the achieving of a method of separating waste paper and plastics from the extraneous contaminating components that typically accompany a paper containing waste material would be highly desirable. This is particularly true if the paper and plastic containing waste material is municipal solid waste. Municipal solid waste typically contains 40-60% paper materials along with a varying assortment of glass, metals, rags, food wastes, plastics, etc.

More specifically, I have found typical component compositions for municipal solid wastes to be as follows:

TABLE 1

| | |
|---|---|
| Paper | 50.0% |
| Iron | 8.0% |
| Aluminum | 2.0% |
| Plastic | 6.0% |
| Glass | 8.0% |
| Food Waste | 1.5% |
| Grass Clippings | 2.5% |
| Moisture | 20.0% |
| Miscellaneous | 2.0% |
| (Leather, Textiles, Rubber, Wood, etc.) | |
| | 100.0% |

Currently the vast majority of paper and plastic containing waste materials are being landfilled, resulting in the loss of paper and recyclable materials and the using up of valuable land space. Landfills also threaten the environment with contamination of surface waters and groundwaters, and present health hazards and public nuisances by increasing numbers of disease-carrying birds, rodents and insects.

The problem is an ever-increasing one. By their existence, municipalities and industries generate paper-containing and plastic-containing wastes continually and these wastes must be properly disposed of. Various approaches such as incineration, composting and producing refuse-derived fuel have been considered as alternative solutions to sanitary landfills.

Incineration, although it can reduce the amount of landfilling required, produces undesirable and hazardous pollutants which are released to the air, primarily by the combustion of plastics contained in the waste materials and the volatilizing of metals such as aluminum also contained therein. Incineration also produces few products to generate revenue except for energy sales of steam and electricity, which are dependent on adjacent customers and subject to rates set by local public utilities, and thus the burden of debt retirement of an incineration facility falls upon the public.

Composting, which is the process of subjecting waste materials to microbial action to produce a soil-like material has potential only as a soil conditioner. Because it contains little nutrient value, compost cannot compete as a fertilizer, and quite unfortunately, the concentration of heavy metals resulting from the compost may cause unacceptable levels of heavy metals to be absorbed into plants, and therefore into the food chain.

Producing refuse-derived fuel from waste materials requires that a series of steps be taken to separate combustible materials from non-combustible materials. This results in several classification processes, producing a number of low quality products of limited value. The refuse-derived fuel produced contains plastics and as such, when combusted, will produce undesirable and hazardous pollutants, which are released to the atmosphere.

Because of the problems that are inherent to the present methods of waste disposal, because of the continuing need to dispose of waste materials, and because of the need to recover valuable products that are now being lost, it has become highly appropriate for the perfection of the instant separation and recovery of component fractions from waste paper and plastic containing materials.

SUMMARY OF THE INVENTION

The main objective of this invention is to provide equipment that accomplishes repulping of the repulpable waste material by the unique use of lifting paddles and directional flighting in an inclined rotating vessel. These components effect a countercurrent flow of material within the vessel in what I call the second rotative direction, by virtue of the opposing flow actions imparted to the waste materials by the novel components I use on the interior sidewalls of the vessel, these being spaced lifting paddles as well as directional flighting.

Now in more detail, the present invention provides a method and an apparatus for the separation and the recovery of component fractions, especially paper and plastic, from paper-containing and plastic-containing waste materials. A major consideration of this invention is that the paper and plastic containing waste materials be handled and introduced into the apparatus without it being necessary beforehand to accomplish either size reduction, or the separation and special handling of the waste. The only significant exception is that it is still necessary to remove from the waste stream, certain items such as large appliances, demolition rubble, etc.

The term "paper" in accordance with this invention shall be taken to mean all of those materials that consist of the product of cellulosic fibers that have been reduced to pulp and reconstructed into containers, wrappers, or materials to write on.

"Plastic" in accordance with this invention shall mean all of the organic, synthetic or processed materials including resins, foams, films, sheets and alloys (composites) that are molded, cast, extruded, drawn or laminated into objects or films.

The paper-containing and plastic-containing waste material is initially treated with moisture to achieve a minimum moisture content of 30% in the moisture absorptive materials by weight, with 65% to 75% moisture content of the moisture absorptive materials by weight being optimum. The moisture non-absorptive materials, such as metals, glass and plastics that may be present are ignored in the moisture addition calculations. The apparatus is then agitated by suitable means well known to those skilled in the art, in this case by rotation to accomplish agitation of the mixture to allow the moisture to have complete and intimate contact with the components in the waste material, thus to effect repulping of the paper components. Heat may be applied to the mixture in the form of hot water that is added to achieve the desired moisture content, or by heat exchangers in the shell of the apparatus or installed inside the apparatus. Preferably, however, heat in the form of saturated steam is injected directly into the mixture, in this case through piping that is installed in the vessel facilitate this addition. The addition of heat to a reaction, increases the rate of the reaction.

Repulping in accordance with this invention is accomplished in the presence of moisture, and agitation and the time of repulping is affected by the appropriate addition of heat. This results in a size reduction of the various and irregularly sized paper components in the mixture into a homogeneous pulp, and a corresponding increase in the bulk density of those pulped components that are able to be separated from the non-pulpable components in the mixture. Various components such as food wastes that are pulpable are partially hydrolyzed and pulped, and are incorporated into the pulped fluff of the paper components.

After repulping has been accomplished, the apparatus is then rotated to empty the vessel of pulpable components and non-pulpable components, and these separated components are directed to classification equipment, which equipment forms no part of the present invention. Such classification equipment preferably includes trommels, magnetic separators, flotation chambers and sorting tables effective to recover product streams. Additional methods of classification are known to those skilled in the art, and inasmuch as this invention is not concerned with any particular classification methods, I am, quite clearly, not limited only to those classification methods referred to hereinabove.

The apparatus in accordance with the present invention involves a cylindrical vessel designed to rotate around its horizontal axis alternately and selectively in each direction. This vessel is mounted at slight angle of incline to the horizontal, with the preferred incline being 4°. My cylindrical vessel is equipped with lifting paddles and directional flighting located inside of the vessel to facilitate agitation, and to direct movement of the material in the vessel. In one exemplary embodiment it was preferred for the lifting paddles to be installed in approximately the first half or first section of the vessel, and the directional flighting to be installed in approximately the second half or second section of the vessel. These components are discussed at length hereinafter.

As the vessel is rotated, the material in the vessel is tumbled as it is carried, in contact with the sidewall of the vessel, up the sidewall of the vessel a distance equal to the angle of repose of the material times the coefficient of friction of the material times the speed of rotation of the vessel. The coefficient of friction of the material is equal to the force required to move a mass volume of the material on a surface divided by the normal force exerted by that mass volume on the surface by its bulk density and gravity. In the exemplary embodiment, the coefficient of friction is approximately 0.2, and the angle of repose of the material in this case is 45°.

As the vessel continues to rotate past the maximum point of the angle of repose of the material, the material is tumbled from the sidewall of the vessel upon itself resulting in a mixing of the materials.

An angle of incline of the vessel facilitates a movement of material through the vessel in that at the point of the angle of repose, the material is tumbled forward upon itself a distance equal to the height of the material on the sidewall of the vessel times the sine of the angle of incline of the vessel.

The movement of materials within the vessel by the lifting paddles is accomplished by the rotation of the vessel in combination with the angle of incline of the vessel, and is independent of the direction of rotation of the vessel. That is, the material is advanced through the vessel with the downward angle of incline of the vessel a distance equal to the sine of the angle of incline times the distance from the centerline of the bottom of the vessel to the point of discharge of the surface of the lifting paddles per revolution of the vessel.

Agitation of the materials by the lifting paddles is accomplished by the tumbling and dispersing of the materials by the lifting paddles located in the second section of the vessel, during rotation of the vessel.

A fraction of the materials is lifted on the face of each of the lifting paddles in concert with the rotation of the vessel, and then is discharged from the face of the lifting paddles as the rotation of the vessel continues past the point of the angle of repose of the materials on the face of each of the paddles. As may be apparent to those skilled in this art, the materials fall randomly off the face of the lifting paddles into the mass of materials in the vessel, resulting in a very thorough mixing of the materials.

As may also be apparent to those skilled in this art, the amount of mixing of the materials in the vessel is dependent on the angle of incline of the vessel, for as previously mentioned, the materials are advanced a greater distance through the vessel per revolution of the vessel with a larger angle of incline. Therefore, a larger angle of incline results in a faster movement of materials through the vessel and requires fewer revolutions of the vessel for the movement of materials through the vessel and consequently less mixing of the materials occurs since fewer fractions of the materials are lifted and dispersed into the mass of materials in the vessel. Because the lifting paddles are symmetrical, the mixing of the materials and the advancement of the materials through the vessel are independent of the direction of rotation of the vessel.

Somewhat in contrast with the foregoing, the movement of the materials within the vessel by the directional flighting is accomplished by the rotation of the vessel and by the effect of conveyance or longitudinal motion imparted by the helix to the material contacted by the helix. The direction or movement of the materials by the helix is dependent upon the direction of rotation of the vessel and will be forward through the vessel away from the inlet end of the vessel in what I regard as the first rotative direction, and backward toward the inlet end of the vessel in what I regard as the second rotative direction.

Agitation of the materials by the directional flighting is accomplished by the tumbling of the materials by the helix during the rotation of the vessel as the materials are contacted with the face of the helix and longitudinal movement through the vessel is imparted to the materials by the angular nature of the helix in concert with the rotation of the vessel.

I have found that this movement is a rolling action of the materials on the face of the helix and because of the frequency and depth of the helix, a fraction of materials are moved through the mass of materials in the vessel at a rate equal to the area of the depth of the helix times the angle of repose of the materials times the frequency of the helix. With the depth of the material in the vessel being greater than the depth of the helix, a fraction of the mass of material is moved through the mass of materials, in the second rotative direction, in a direction opposite to the direction imparted by gravity on the mass of materials in the vessel not in contact with the helix. This is due to the vessel being installed on an angle of incline, and this results in a particularly thorough mixing of the materials.

As the repulping is accomplished, the volume of materials is condensed, quite advantageously, to approximately one-third of the initial volume of the materials and therefore, as the repulping process is being conducted, an increasing percent age of the materials is being directed "backward" through the vessel. The amount of mixing of the materials by the helix is dependent on the frequency of the helix in that a greater frequency, that is, more complete helical cycles per revolution of the vessel, results in more helical surface area in contact with the material in the vessel and therefore more movement of material within the mass of material in the vessel.

The rate of movement of material through the vessel by the helix is dependent on the depth of the helix times the frequency of the helix times the rate of rotation of the vessel.

It is well known to those knowledgeable in the industry that a segregation by size of materials occurs in a rotating vessel with the larger particles (non-pulped materials) rising to the top of the mas of materials in the vessel and the smaller particles (pulped materials) falling to the bottom of the mass of materials.

As made clear hereinabove, the action of the helix causes an amount of material at the bottom of the vessel equal to the depth of the helix to be conveyed through the mass of materials. Because size segregation will occur in the second section of the vessel where the helix is located, upon rotation of the vessel in the first rotative direction to discharge the materials from the vessel, the pulped materials which have fallen to the bottom of the mass of materials will be conveyed through the mass of materials and discharged, at least to some extent, first. The non-pulped materials, which have risen to the top of the mass of materials due to the effect of segregation, will, at least to some extent, be discharged last.

As should now be clear, the movement of material through the vessel by the rotation of the vessel and by the lifting paddles located in the first section of the vessel is dependent on the angle of incline of the vessel, and is independent of the direction of rotation of the vessel. The movement of material on the surface of the helix, however, is understandably dependent on the direction of rotation of the vessel.

In the second rotative direction, as previously described, material is moved away from the discharge end of the vessel toward the inlet end by the helix. The combination of the backward movement of material by the helix in the second rotative direction and the forward movement of material by the lifting paddles and by the angle of incline of the rotating vessel in either rotative direction results in a highly advantageous interaction of the forward and backward movement of material in the vessel. The interaction of the forward movement and the backward movement of the material understandably results in a circular recycle of material due to the lifting and the dropping forward of the material by the lifting paddles and the advancement of the material backward by helix under the mass of forward falling material.

It is to be realized that the vessel is rotated in the second rotative direction, that is, the direction that accomplishes movement by the directional flighting of the contained materials backward through the vessel, during the time that heat is added to the material in the form of saturated steam. This is to further enhance the contact of the mixture of materials with the added heat, and it should be noted that the amount of steam added to the mixture of materials is determined by the amount of material to be processed in a prescribed amount of time.

My novel vessel is equipped with a well-known type of positive feeding device for forcing the non-flowing paper-containing and plastic-containing waste materials into the vessel, and in this instance the positive feeding device is preferably a hydraulic or pneumatic ram. The vessel is ram fed through an opening on the inlet end. The opening in the vessel is then sealed with a closure device. The closure device isolates the vessel from the atmosphere to seal the vessel and to allow a buildup of pressure to occur within the vessel during its operation.

The closure device is a removable cap that locks onto the vessel and rotates with the vessel when closed.

My novel vessel is equipped with piping to facilitate the addition of moisture to the necessary concentration of the mixture of the materials, and the addition of heat to increase the rate of reaction. This piping is oriented in approximately the bottom ⅔ of the vessel and provides openings in the piping at intervals in this area. Furthermore, the vessel is equipped with pressure relief vents to direct the residual heat of the process to heat exchangers for energy conservation and for safety of operations.

It is therefore a main object of my invention to provide a method and apparatus for accepting substantially untreated paper-containing and plastic-containing waste material and, in a single unit operation, to accomplish pulping of the pulpable components in the waste material, thus to produce a homogeneous pulped product that separates readily from the non-pulpable components included in the waste material.

It is another object of this invention to provide a novel rotary vessel of substantial length, containing novel components in its interior by the use of which an extremely thorough mixing of waste material ca n be readily accomplished at minimal cost, and whose direction of rotation can be changed as needed.

It is still another object of this invention to provide a novel method for considerably reducing the bulk of waste material, by accomplishing a thorough mixing of such waste material in the presence of heat and agitation, with this method being able to be pursued without necessitating the employment of highly skilled personnel.

It is yet still another object of my invention to provide a novel rotative, low maintenance vessel into which controlled quantities of paper-containing and plastic-containing waste can be loaded, and then treated under heat and pressure to accomplish thorough mixing and pulping of the pulpable materials, this being accomplished in a low cost, yet highly effective manner.

These and other objects, features and advantages will become more apparent as the description proceeds.

BRIEF DESCRIPTION OF THE DRAWINGS

FIG. 1a is a fragmentary view of a typical lifting device enabling me to change the angularity of the longitudinal centerline of the rotating vessel with respect to the horizontal;

FIG. 1b is a fragmentary view showing a typical mechanism I utilize for providing a rotatable support for the rotating vessel;

FIG. 1c is a fragmentary view from above of the rotatable support shown in FIG. 1b;

FIG. 11b is a side view of the mechanism of FIG. 11a; and

DETAILED DESCRIPTION OF THE PREFERRED EMBODIMENTS

Figure 1:
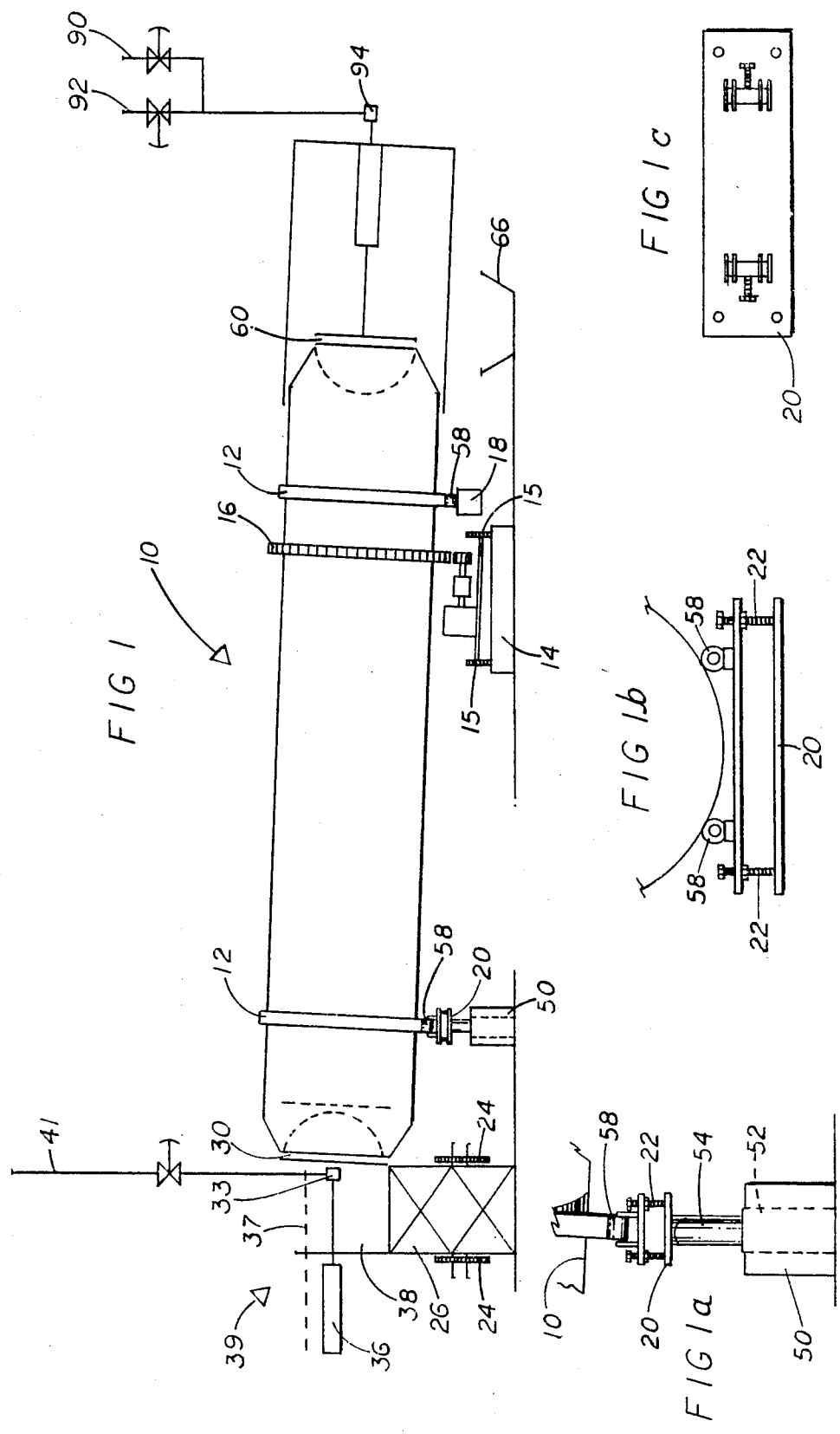
FIG. 1 is a side elevational view of the apparatus of the present invention.

In FIG. 1, I reveal my novel apparatus for the separation of component fractions from paper-containing and plastic-containing waste materials, the use of which involves in accordance with this invention, a novel method. This invention includes the advantageous utilization of a processing vessel 10 encircled by a pair of support rings 12, each of which has a smooth outer surface contacted by a pair of spaced apart rollers. The vessel 10 is capable of being rotated in either direction on its horizontal axis by means of a drive assembly 14. The drive assembly may for example utilize a reversible electric motor of approximately 50 horsepower, connected to turn the vessel 10 in the selected direction through the use of suitable reduction gearing. A drive ring 16 encircles the vessel 10, with which the drive assembly interacts. Although I could have a spur gear driving a straight toothed drive ring 16, I prefer to use a heavy duty drive chain arrangement, with the encircling chain in driving contact with a drive ring 16 in the nature of a sprocket.

The vessel 10 is generally cylindrical in configuration, and is rotatably supported by means of a rear carrier device 18, and a front carrier device 20. Each of the carrier devices utilizes at least one pair of spaced apart rollers that are in contact with the respective support rings 12, as will be discussed shortly.

The front carrier device 20 is revealed in FIGS. 1a and 1b to utilize trunnion rollers and bearings, as will be noted in these figures. Suitable adjustment components are utilized on the front and rear carrier devices, which may be in the nature of height adjustment bolts 22. Further details will shortly be revealed.

The vessel 10 is provided with an inlet assembly 30, which will be discussed in greater detail in connection with FIG. 9. The vessel 10 is likewise provided with a fixed discharge assembly 60, which will be discussed in greater detail in connection with FIG. 10.

The vessel is also equipped with a closure device 40 on the inlet assembly 30, and a closure device 64 on the discharge assembly 60, so that substantial pressure can be built up inside the vessel 10 at selected times. The dimensions of a vessel utilized in a given instance are determined by the amount of material likely to be processed within a prescribed amount of time.

It is desirable in the utilization of my elongate rotative vessel 10 to employ a specific type of mechanism for changing the angle of inclination of the vessel on occasion, and the preferred embodiment of this mechanism is illustrated in some detail in FIGS. 1a, 1b and 1c.

FIG. 1a depicts a preferred lifting arrangement, involving a support base 50 serving to support a hydraulic cylinder or actuator 52. Vertically slidable in the hydraulic cylinder 52 is a hydraulic piston 54, which is arranged to move into and out of the hydraulic cylinder 52 in response to the application of hydraulic pressure.

At the upper end of the hydraulic piston 54 is the front carrier device 20, which is in the nature of a support platform for the rollers 58 that are in contact with the outer surface of the respective support ring 12 that encircles the rotatable vessel 10. Thus, as the hydraulic piston 54 is caused to move upwardly in its actuator 52, this in turn brings about a lifting effect on the underside of the rotatable vessel 10, with this arrangement therefore permitting the operator to bring about operation of the vessel 10 at a desired angle of inclination of its longitudinal centerline with respect to the horizontal.

A lifting mechanism is also necessary in connection with the drive assembly 14, such that it remains in the appropriate relationship to the drive ring 16. At the same time the piston 54 is caused by hydraulic pressure to raise or lower the front carrier device 20, the rear carrier device 18 remains stationary except for a slight adjustment in the rollers 58 to maintain correct contact with the support ring 12. By locating the drive assembly 14 in close proximity to the rear carrier device 18, the lifting mechanism necessary to maintain the appropriate relationship of the drive assembly 14 to the drive ring 16 needs less height adjustment capability.

The preferred lifting mechanism for the drive assembly utilizes height adjustment bolts 15 incorporated into the base plate of the drive assembly, the adjustment of which causes the drive assembly 14 to move an appropriate amount in the correct direction.

The vessel 10 in accordance with this invention is ordinarily operated on an incline, as will hereinafter be discussed, and a series of lifting paddles 70 are utilized in the forward section or inlet half of the vessel; note FIGS. 4 and 7. The inlet end is the higher end, and the angle of the incline, the number and size of the lifting paddles 70 I use, and the number and size of the directional flighting 80 discussed hereinafter are to be determined by the amount of material to be processed in a prescribed amount of time.

Figure 4:
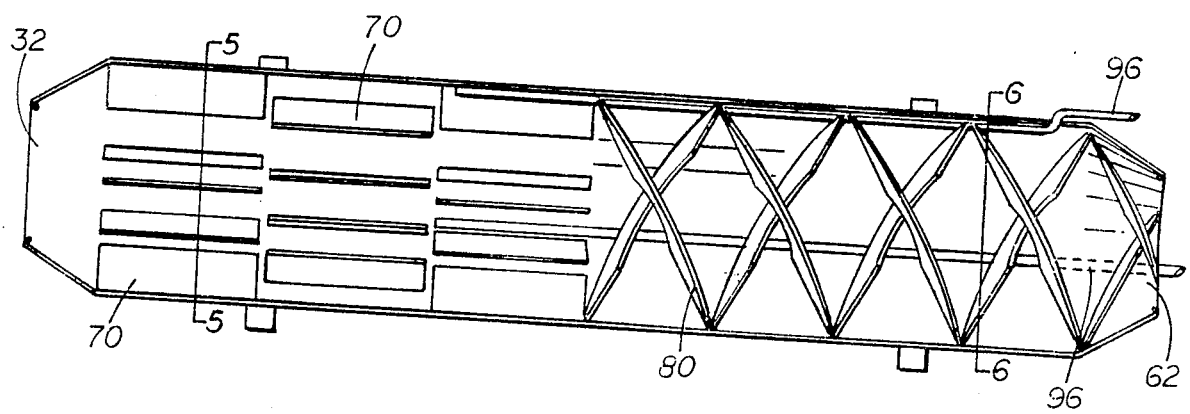
FIG. 4 is a side elevational view of the apparatus to a slightly larger scale than in FIG. 1, with the near wall of the vessel removed to reveal internal construction.

At an angle of incline of 4° from the horizontal, the lifting paddles 70, visible in FIG. 4, will advance the paper-containing and plastic-containing waste material approximately 0.488 feet per paddle discharge with a particular mass unit of waste material being contacted and lifted twice per revolution by a particular paddle requiring a rotational speed of 3.3 rpm to accomplish the advancement of the materials through the vessel in 15 minutes.

For a change in the angle of incline of the vessel of 4°, the support platforms for the carrier bearings are equipped to raise or lower the front carrier device 20 and the drive assembly 14, thus effecting a change in the angle of incline of the vessel 10. The angle of incline of the vessel may need to be radically changed from time to time because of a great variation in the composition of the paper-containing and plastic-containing waste materials being processed.

Figure 9:
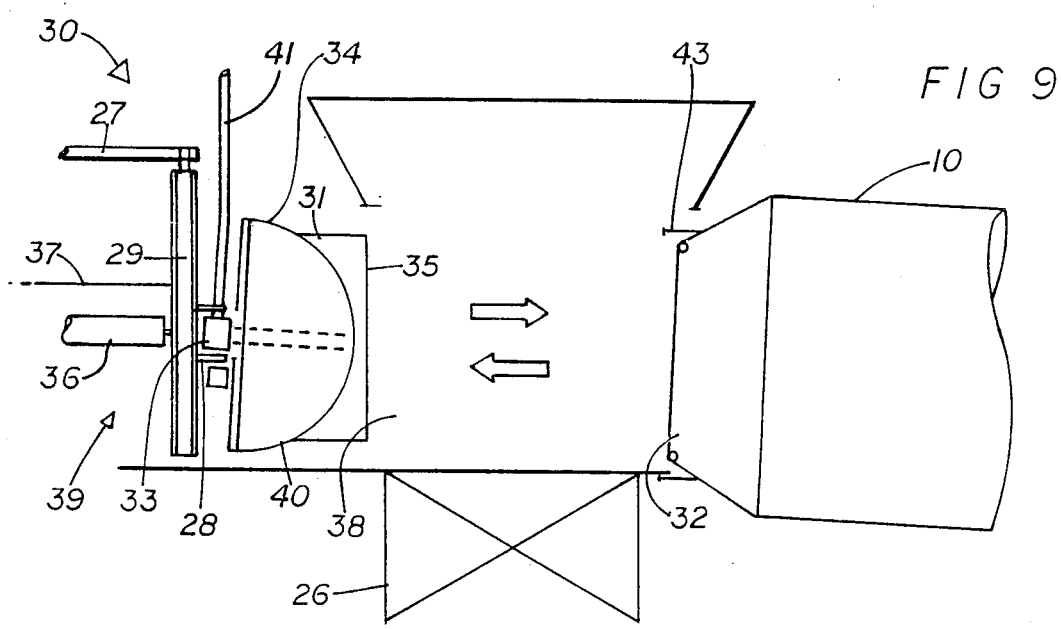
FIG. 9 is a cross section showing the feed mechanism of the vessel in some detail.

The feed mechanism 39 I prefer to use adjacent the opening 32 of the inlet assembly 30 is depicted in FIG. 9. The feed mechanism must also be capable of being adjusted to match the change in the position of the inlet opening 32 of the vessel, by the utilization of structural extensions attached to the supports 26 for the feed mechanism as needed. The feed mechanism 39 is supported independently of the rotating vessel by means of a structural steel framework 26. This structural steel framework contains slidable, sectioned support legs that are extendable by means of height adjustment bolts 24 between the sections.

As the angle of incline of the vessel 10 is changed by means of the hydraulic piston 54 as previously described, the alignment of the drive assembly 14 must be adjusted by means of the height adjustment bolts 15 as earlier mentioned. It is also necessary to adjust the height of the feed mechanism 39 by raising or lowering the height adjustment bolts 24 between the sections of the structural support legs, causing the feed mechanism to move an appropriate amount in the correct direction.

Figure 5:
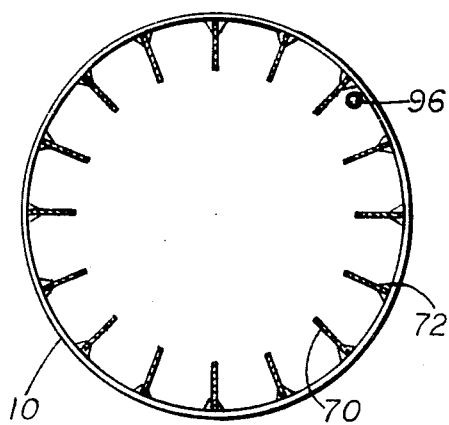
FIG. 5 is an end view cross section of the inlet taken at section 5—5 in FIG. 4, showing the lifting paddles.

A typical rate of rotation for the vessel 10 should be between 2 and 10 RPM and preferably approximately 4 RPM to facilitate a more uniform loading of forces on the rotary drive of the vessel. The lifting paddles 70 are distributed in sections and staqqered at 22° intervals from one section to the next, as indicated in FIGS. 4 and 5. Variations in the rate of movement of material in the vessel, the size and frequency of the lifting paddles, the size and frequency of the directional flighting 80 used in the discharge portion of the vessel, the angle of incline of the vessel and the rate of rotation of the vessel in accordance with this invention will shortly become obvious to those skilled in the art. It will also be brought out hereinafter that I may prefer to inject water and/or steam in the processing of certain waste.

Figure 6:
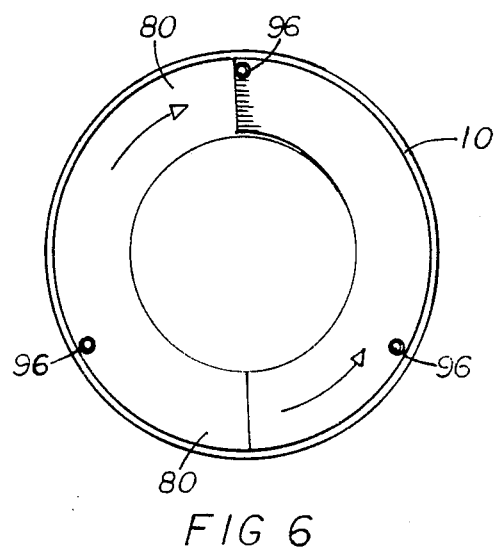
FIG. 6 is a cross sectional view at a midportion, taken at section 6—6 in FIG. 4, and showing the directional flighting or helix.
Figure 7:
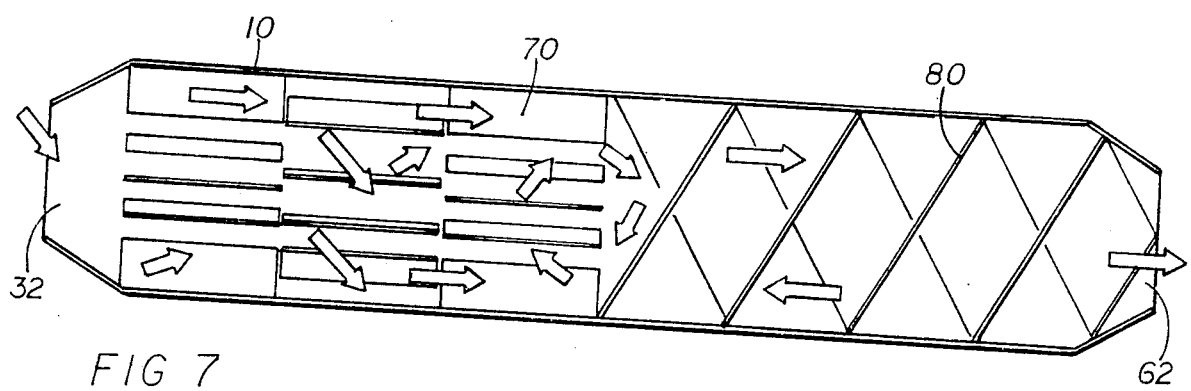
FIG. 7 is a side elevational view of the rotatable vessel similar to FIG. 4, but showing by the use of arrows, the path taken by the paper-containing and plastic-containing waste during the pulping effort.

In the discharge half or second section of the interior of the vessel 10, the directional flighting 80 is provided to accomplish movement and agitation of the material in the vessel; note FIGS. 4, 6 and 7. Both the lifting paddles 70 as well as the helically configured flighting 80 are affixed to the interior shell of the vessel 10 in a manner consistent with the maintaining of the least amount of obstruction to the flow of material.

As will be apparent to those familiar with this art, by applying a greater angle of incline or a lesser angle of incline, larger and more frequent paddles or smaller and less frequent paddles, larger and more frequent helixes or smaller and less frequent helixes, or a faster or slower rotational speed, or a combination of any of these, the amount of material to be processed in a prescribed amount of time can be altered.

Thus it is to be seen that the rate of rotation of the vessel 10, the size and the number of the lifting paddles 70 within the first section of the vessel, the size and the number of the directional flighting 80 within the second section of the vessel, and the angle of incline of the vessel are determined by the amount of material to be processed in a prescribed amount of time.

I have found that to process 20,000 pounds of paper-containing and plastic-containing waste material in one processing cycle with the paper-containing and plastic-containing waste material having a density of 7 pounds per cubic foot and allowing approximately 25% of the interior of the vessel to remain unfilled to permit adequate mixing of the materials within the vessel 10, a vessel that is ten feet in diameter and an effective length of 48½ feet is necessary.

In that the operation of the process may require a pressure of 70 psia, the vessel in accordance with my invention is equipped with closure devices at the inlet and discharge ends of the vessel in the form of dished heads or fabricated cone ends to meet pressure code regulations. Such closure devices will be discussed hereinafter.

The American Society of Mechanical Engineers has written the A.S.M.E. Boiler and Pressure Vessel Code which contains rules for the design, fabrication and inspection of boilers and pressure vessels. The A.S.M.E. Boiler and Pressure Vessel Code consists of eleven sections. The vessel will be involved with sections as follows:

II: Material Specifications
V: Non-Destructive Examination
VIII: Pressure Vessels, Division 2, Alternate Rules
IX: Welding Qualifications Although variations in the dimensions of the vessel are obvious, it should be noted that the regulations for the shipment of materials over the roads generally restrict items of more than 10 feet in diameter, which are regarded as being non-standard shipments, and thus requiring special permits for the oversized transport of those items.

In order to fill a 10 foot diameter vessel having an effective length of 48½ feet in 15 minutes, a feeding mechanism 39 that rams 666.6 pounds of paper and plastic containing waste material into the inlet of the vessel would need to be cycled 30 times in 15 minutes, or 1cycle per 30 seconds. As another example, a feeding mechanism that rams 1000 pounds of paper-containing and plastic-containing waste material into the inlet of the vessel would need to be cycled 20 times in 15 minutes or 1 cycle per 45 seconds to do the same job in the same amount of time.

In order to process 20,000 pounds of paper-containing and plastic-containing waste material in a vessel that is 10 feet in diameter and 48½ feet long and is filled in 15 minutes, paper-containing and plastic-containing waste material that is rammed into the vessel must be advanced through the length of the 48½ foot vessel in 15 minutes.

A waste receptacle 66 is preferably used immediately below the discharge opening 62.

With reference now to FIG. 4, and in accordance with a preferred embodiment of my invention, lifting paddles 70 that are 2 feet high and 8 feet long and ⅜ inch thick are installed on their edge on the interior of the first section of the vessel 10; note FIG. 5. The length of each paddle corresponds to the horizontal plane of the vessel, and are installed at intervals of 0.785 radians around the interior perimeter of the vessel. That is, the paddles 70 are installed at angles of 45° measured around the point of the axis of rotation at the center of the vessel, and furthermore are installed in approximately the first half of the vessel. Each paddle will lift approximately 224.0# of material, and will discharge the material from the face of the lifting paddle at approximately an angle of 45° measured from the point of the axis of rotation with reference to the horizontal centerline of the vessel diameter.

The lifting paddles 70 are supported on both sides by triangular gusset plates 72 (see FIG. 5) to provide support for the paddles against the weight of the materials being lifted during rotation of the vessel in either direction. The lifting paddles are preferably installed in 8 feet long sections along the first section of horizontal dimension of the vessel and FIG. 4 reveals that typically three groups of lifting paddles 70 are utilized, with each of the paddle sections being affixed at a staggered angle of 22½° from the preceding section, rather than being in alignment therewith.

The directional, flighting 80 is utilized in the aft half or second section of the vessel 10, and it preferably consists of a helix that is approximately 2 feet high and ⅜ inch thick. The flighting is affixed on its edge to the interior perimeter of the vessel perpendicular to the interior sidewall of the vessel, with one full cycle of the helix being completed in a distance along the horizontal length of the vessel equal to ½ of the diameter of the vessel, in this case in 5 linear feet of the length of the vessel. This helix will intercept the advancing paper-containing and plastic-containing waste materials from the lifting paddles and will advance the materials at the rate of approximately 439.8 pounds per revolution, and a distance of 5 feet per revolution. At paper-containing and plastic-containing waste material can be advanced 24.25 feet, or approximately the distance of the second half of the vessel, in 7½ minutes.

The movement of the materials within the vessel by the directional flighting 80 is accomplished by the rotation of the vessel and by the effect of conveyance imparted by the helix to the material contacted by the helix or directional flighting. The direction or movement of the materials by the helix is dependent upon the direction of rotation of the vessel and such direction will be forward through the vessel, away from the inlet end of the vessel in the first rotative direction, and backward toward the inlet end of the vessel in the second rotative direction.

The result is a vessel that can be filled in 15 minutes, and thereafter be emptied in the same amount of time.

In that the paper-containing and plastic-containing waste material may be municipal solid waste which inherently has many randomly large objects, the inlet opening 32 of the vessel is 6 feet in diameter. The operation of the process may require a pressure of 70 psia, therefore the closure device 40 for the inlet is dished to withstand the pressure of the operation and to provide a lighter and more manageable component.

Figure 11A:
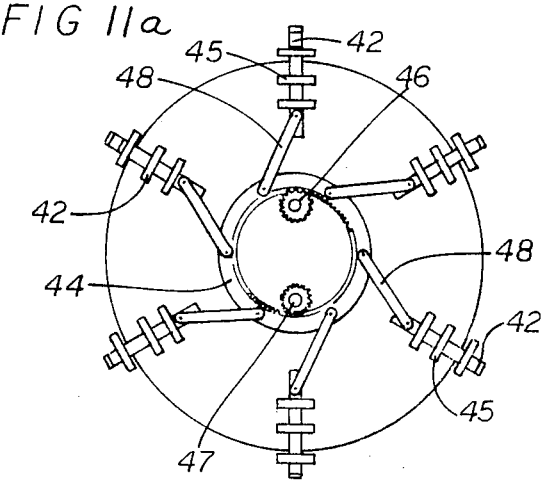
FIG. 11a is a side elevational view of a preferred type of locking mechanism I use for the inlet.
Figure 11B:
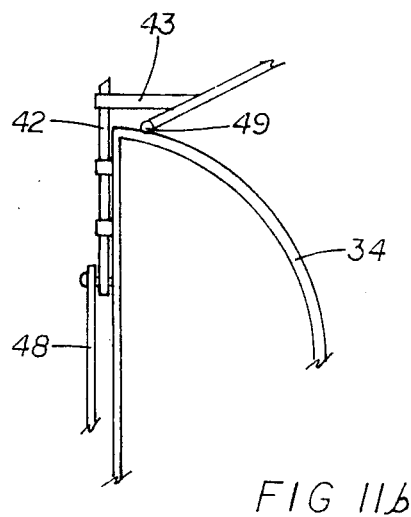

The closure device 40 is oriented for the dome 34 of the dished head to enter the throat of the vessel opening 32 and accomplish sealing of the vessel by matching the surface of the dished head with an "O" ring 49 that is set in a groove machined in the vessel throat; note FIG. 11b. The closure device is locked in place by six sliding bars 42 that are cam activated to slide into eyelets 43 affixed to the shell of the vessel 10; note FIGS. 11a and 11b. The outer ends of the bars 42 are beveled to facilitate entry into the respective eyelets.

A central ring or drive ring 44 is activated by an electric motor (not seen) and a gear reducer (not seen), and a drive gear 46 in turn causes the rotation of the drive ring 44 in the correct direction. The use of an idler gear 47 may be desirable. The radially inner end of the cam arms 48 are connected at spaced locations around the drive ring 44, whereas the radially outer end of the cam arms are connected to the sliding bars 42.

Thus, as the drive ring 44 is caused to turn clockwise as viewed in FIG. 11a, the locking bars are caused to move outwardly into contact with the respective eyelets 43, whereas if the drive ring is caused to turn counter-clockwise, the sliding bars 42 are caused to be withdrawn from the eyelets, such that the closure device can be opened.

The closure device 40 is positioned by a pneumatic cylinder 36 and guided into place by fixed guide rods 27 that are attached to the closure device support assembly 29. The closure device support assembly 29 consists of a structural steel frame that is affixed to the closure device 40 by means of a bearing assembly 28 such as the type that is commercially available from the Fafnir Bearing Co., their No. 5414W. Thus, the closure device 40 is allowed to rotate with the vessel 10 while the closure device support assembly 29 remains stationary.

Affixed to the dome of the dished head 34 is a perforate plate 35 that serves as the feeding mechanism ram plate. The pneumatic cylinder 36 that positions the closure device is on occasion, utilized to ram feed the waste material into the inlet opening 32 of the vessel 10.

Figure 2:
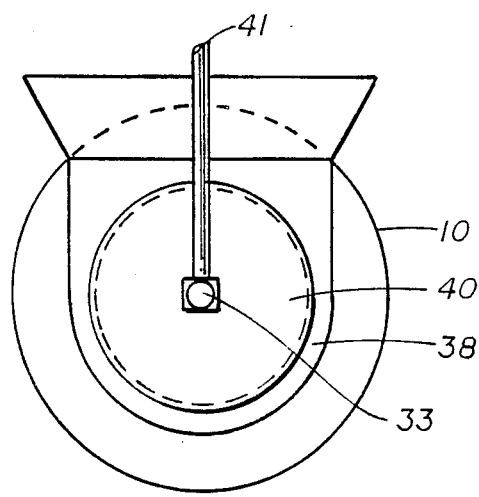
FIG. 2 is an end view of the inlet of the apparatus, revealing inlet piping details.

The perforated plate 35 is circular in configuration to allow entry of the plate into the circular inlet opening 32 of the vessel 10 and to correspond with the hemispherical bottom of the feed hopper 38 as shown in FIG. 2, and is affixed to the dome of the closure device 40 by welded steel struts 31 installed at advantageous intervals around the dome; note FIG. 9.

Figure 10:
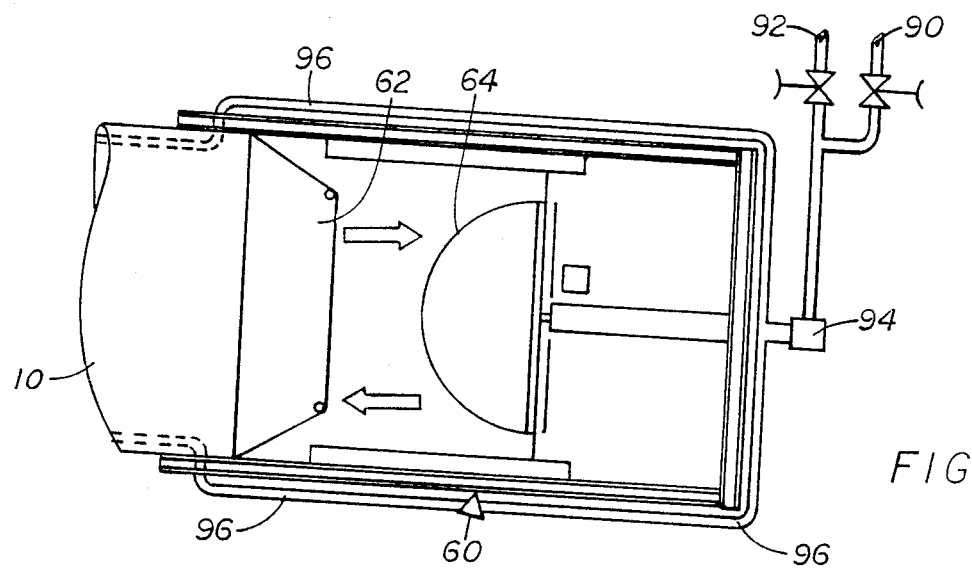
FIG. 10 is a cross section showing a preferred discharge system for the rotating vessel.

The vessel 10 is also equipped with a discharge assembly or closure device 60, as previously mentioned, which discharge closure device is disposed adjacent the discharge opening 62 of the vessel; note FIG. 10. The configuration of the discharge closure device bears a definite relationship to the configuration of the inlet closure device 30, except that the discharge closure device does not have the ram feed requirements of the inlet closure device.

Each of the closure devices, those used at the inlet and the outlet, may be a fabricated steel sliding gate valve such as the type manufactured by the Rodney Hunt Co. of Orange, Mass. as their steel fabricated slide gate. Each closure device may be stationary and affixed to a sealing mechanism to allow the vessel to rotate and maintain its seal. A sealing mechanism such as the type manufactured by John Crane-Houdaille, Inc. of Morton Grove, Ill. as per Drawing No. DM-ST-1180 might be used.

As previously mentioned, by applying a greater angle of incline or a lesser angle of incline, larger and more frequent paddles or smaller and less frequent paddles, larger and more frequent helixes or smaller and less frequent helixes, or a faster or slower rotational speed, or a combination of any of these, the amount of material to be processed in accordance with this invention in a prescribed amount of time can be altered.

Figure 3:
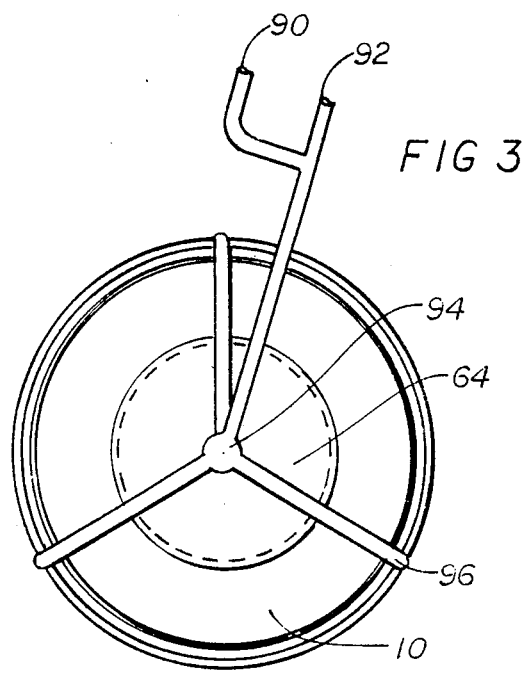
FIG. 3 is an end view of the discharge of the apparatus, revealing the manner in which steam and water may be applied to piping contained in the interior of the rotating vessel.
Figure 8:
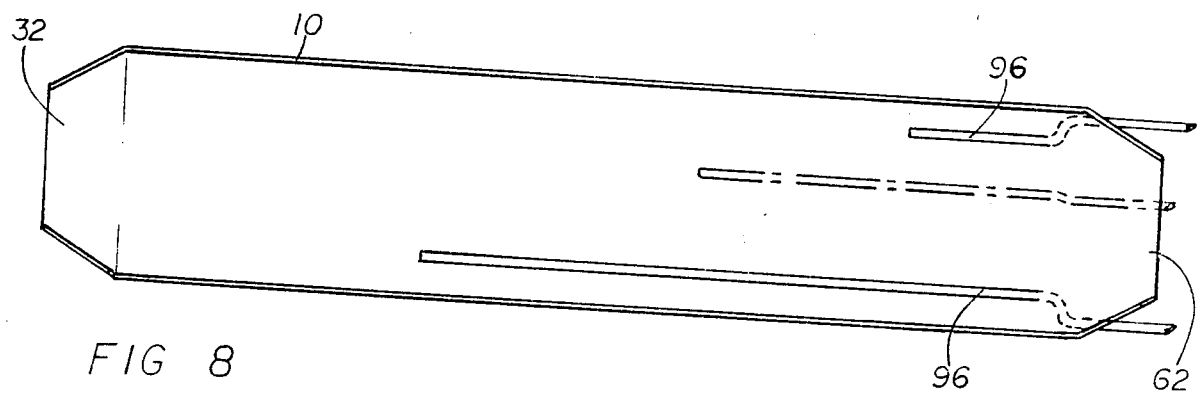
FIG. 8 is a longitudinal cross section showing the distribution piping in the interior of the rotating vessel.

As seen in FIG. 3, the vessel 10 is equipped with piping 90 for the selective addition of steam, and piping 92 for the selective addition of water. The steam piping 90 and the water piping 92 are combined into the injection pipes 96 as shown in FIG. 3 enabling the addition of steam and water to be conducted into the vessel by the same pipes. The injection piping 96 extends approximately two-thirds into the length of the vessel from the discharge end as shown in FIG. 8, to facilitate intimate contact of the steam and water with the material to be processed. The injection piping is affixed to the shell of the vessel in such a manner as to maintain the least amount of obstruction to the flow of material on appurtenances within the vessel. The affixed injection piping has openings at intervals into the vessel to provide consistent contact of the steam and the water with the paper-containing and plastic-containing waste materials to be processed. The affixed injection piping is permitted to rotate with the vessel by virtue of a rotary seal 94 that is connected to the steam and water piping. The seal is located on the centerline of the axis of rotation of the vessel, adjacent the discharge end; note FIGS. 1, 3 and 10.

It is to be realized that the vessel 10 is rotated in the second rotative direction, that is, the direction that accomplishes movement by the directional flighting 80 of the contained materials backward through the vessel, during the addition of steam through pipe 90 and injection piping 96. This is to further enhance the contact of the mixture of materials with the added heat, and it should be noted that the amount of steam added to the mixture of materials is determined by the amount of material to be processed in a prescribed amount of time.

The rotary seal 94 may be of a type manufactured by John Crane-Houdaille, Inc. of Morton Grove, Ill. such as their face type seal. This permits steam and water from a stationary source of supply to be introduced to the rotating injection piping system while maintaining an isolation of the processing vessel from the atmosphere, facilitating a buildup of pressure in the vessel as the material in the vessel is being processed.

The affixed piping 90 and 92 will include flex hose connections to accommodate positional changes in the piping due to a change in the angle of incline of the vessel as previously described.

As an example, the seal 94 may be affixed to a stationary point in the throat of the discharge system, but I am not to be limited to this, for other arrangements within the spirit of this invention may also be utilized.

Turning now to FIG. 9, the vessel is equipped with a fixed inlet assembly consisting of the feed hopper 38, the hydraulic or pneumatic ram assembly 36 and the hydraulic or pneumatic piston cover assembly 37. The vessel is also equipped with vent piping 41 affixed to the inlet assembly of the vessel to relieve the vessel of excess pressure during the operation of the process, and to direct excess heat from the process to a heat reclamation system to pre-heat water for addition to the process.

A rotary seal 33 of the type manufactured by John Crane-Houdaille, Inc. of Morton Grove, Ill. such as their face type seal may be utilized to facilitate the connection of the rotating vent piping on the vessel with the stationary vent piping system. A pressure control system such as the type manufactured by the Fisher Co. of Marshalltown, Ind. is preferably installed on the stationary vent piping system, but is not illustrated herein.

The rotary seal 33 is located inside of the bearing assembly 28 on the support assembly 29 of the inlet closure device 40 as seen in FIG. 9. The affixed piping 41 will also include flex hoses to accommodate positional changes in the piping due to a change in the angle of the incline of the vessel as previously described.

In accordance with the operation of my novel method, and as later discussed in connection with the diagrammatic showing of FIG. 12, paper-containing and plastic-containing waste material is carried by a suitable conveyor to the feed hopper 38 of the processing vessel 10. The feed hopper is visible in FIGS. 1 and 2, and be st see n i n FIG. 9. In this case, the paper-containing and plastic-containing waste material is municipal solid waste, which may also contain an assortment of materials varying in size, shape and density, which may not necessarily be free-flowing.

The inlet closure device 40 located in the throat of the inlet system of the vessel 10, and its details are best seen in FIG. 9. The dome portion 34 of the inlet closure device, as previously described, is oriented to enter the throat portion of the vessel inlet opening 32, providing a flat surface on the backside of the closure device on which to mount a locking assembly to lock the closure device in place on the vessel.

As were seen in FIG. 11a, a number of radially slidable locking bars 42 are provided at spaced locations around the backside of the closure member 40, such as, for example, one slidable locking bar being disposed every 60°. A plurality of bar guide members 45 are provided with each locking bar, to keep it in the desired operative relationship.

As were noted in FIG. 11a, a number of evenly spaced gear teeth are disposed about the inner surface of the drive ring 44, which teeth are in mesh with the teeth of two comparatively small spur gears, 46 and 47. The upper spur gear 46 may be regarded as the drive gear, whereas the lower spur gear 47 is regarded as the idler gear.

As previously explained, by virtue of a locking eyelet 43 being provided at each of a number of spaced locations on the stationary member surrounding the circular member, the previously-mentioned radially movable locking bars 42 can interact therewith. More specifically, by placing the locking eyelets adjacent the outer end of the slidable locking bars 42, the closure device 40 can be effectively locked in the operative position at such time as the drive ring 44 has been rotated to cause the locking bars to move outwardly.

With brief reference to FIG. 10, the dome portion 64 of the discharge closure device is oriented to permit it to enter the throat of the vessel discharge opening 62. The backside of the closure device is flattened to perm it the installation of a locking mechanism, preferably constructed along the lines described for the inlet closure device.

When the inlet closure device 40 is opened, the vessel 10 is ready to be filled. As previously described, the feed hopper 38 has a specific volume and the operator will fill this hopper by activating a conveyor bringing the materials to the process. When the hopper is filled, the operator will shut off the filling conveyor. Paper-containing and plastic-containing waste material is forced from the feed hopper 38 into the inlet 32 of the vessel 10 by means of the hydraulic or pneumatic ram 36 assembly located in feed hopper 38. The ram 36 forces the material into the throat of the vessel 10 where it can be advanced into the vessel by means of the rotation of the vessel in the first rotative direction in conjunction with the angle of incline of the vessel and the lifting paddles 70 and the helical flighting 80 as previously described. The ram 36 is then withdrawn from the throat of the vessel, and re-positioned in the feed hopper 38 to again be in a position for the next cycle of forcing incoming waste materials from the feed hopper into the vessel.

The operator then continues the cycle of refilling the hopper and of ramming the material into the vessel until the vessel is filled. The filling of the vessel is determined by the number of cycles of the volume of the feed hopper that the operator has put into the vessel. It is to be noted that additional incoming waste material is prevented from obstructing the hydraulic or pneumatic ram 36 on its backstroke by means of piston cover 37.

It is to be noted that the size of the feed hopper and the frequency of the cycling of the ram assembly 36 is determined by the amount of material to be processed in a prescribed amount of time. In a particular instance, the filling of the vessel was to be completed in 15 minutes and therefore, the frequency of the cycle of the hydraulic ram was 30 seconds, and the volume of the feed hopper was 1/30th of the volume of the material to be processed in a single batch. Appropriate variations in the rate of filling, the size of the feed hopper and the cycling of the ram assembly in accordance with this invention will be obvious to one skilled in the art.

During the filling operation, the discharge closure device 64 is closed to prevent spillage. The rotary vessel 10 is driven in rotation in the first rotative direction that brings about forward movement of the incoming waste material away from the inlet throat of the vessel and through the vessel, such being accomplished by virtue of the lifting paddles 70 the first section of within the vessel, the favorable angularity of the directional flighting 80 within the second section of the vessel, and the angle of the incline of the vessel.

In a preferred instance, the rate of movement of material within the vessel is 15 minutes from the initial entry of the material into the vessel to the point of discharge from the vessel. This of course corresponds to the fifteen minute period established for the filling of the vessel mentioned hereinbefore.

I prefer for the height of the active surface of each lifting paddle 70 to be 20% of the diameter of the vessel, and the number of lifting paddles involves one being placed every 45° of the circumference of the vessel; see FIG. 5.

The height of the directional flighting is 20% of the diameter of the vessel, and the number of directional flights is two, as indicated in FIG. 6. The helical frequency is equal to one complete helix per ½ diameter of the vessel.

I also prefer for the angle of incline of the vessel to be at a small acute angle to the horizontal. In one exemplary embodiment I found the most appropriate angle to be 4° to the horizontal, but this particular angle may not be appropriate in all circumstances. I have found that in most instances, the angle the vessel bears to the horizontal should be an acute angle between 2° and 22° to the horizontal.

When the paper-containing and plastic-containing waste material has a higher concentration of paper components, such as 75%, I have found that the angle of incline should be more nearly 2° to the horizontal. When, however, the paper-containing and plastic-containing waste material has a higher concentration of plastic components, such as 50%, the angle of incline should be more nearly 15° to the horizontal. For a change in the angle of incline, the support platform for the carrier bearings on the inlet end of the vessel, as revealed in FIG. 1a, should be capable of being raised or lowered such as by hydraulic cylinders to alter the angle of incline of the vessel throughout the range of operations anticipated. The feed mechanism for the vessel must also be capable of being adjusted to match the inlet of the vessel.

A specific type of arrangement I prefer to use at such time as the angle of inclination is to be changed has already been mentioned to be illustrated in detail in FIGS. 1a, 1b and 1c.

During the filling operation, water is added to the incoming paper-containing and plastic-containing waste material to accomplish a minimum moisture content of 30% of the moisture absorptive components of the waste material, with 65 to 75% moisture content being optimum. The amount of moisture to be added is dependent upon the initial moisture content of the incoming material (see FIG. 12, component composition of municipal solid waste), whereas the moisture non-absorptive components of the waste material are ignored. In this case, water is added to the mixture through piping 92 and is distributed to the material throughout the vessel 10 by suitable injection piping 96 which accomplishes intimate contact of the waste material with the necessary added moisture. The vessel 10 is rotated during the moisture addition to further enhance the contact of the waste material with the added moisture.

Since the feedstock materials will typically have a consistent moisture content, as previously described, the amount of water to be added will be consistent for long periods of time and only intermittent moisture content testing of the feedstock will be necessary. The addition of water by the operator during the filling process will therefore be to simply start the flow of additional water to the system through a meter with a pre-set volume cut-off such as one that is commercially available from the Neptune Measurement Co. of Greenwood, S.C.

Figure 12:
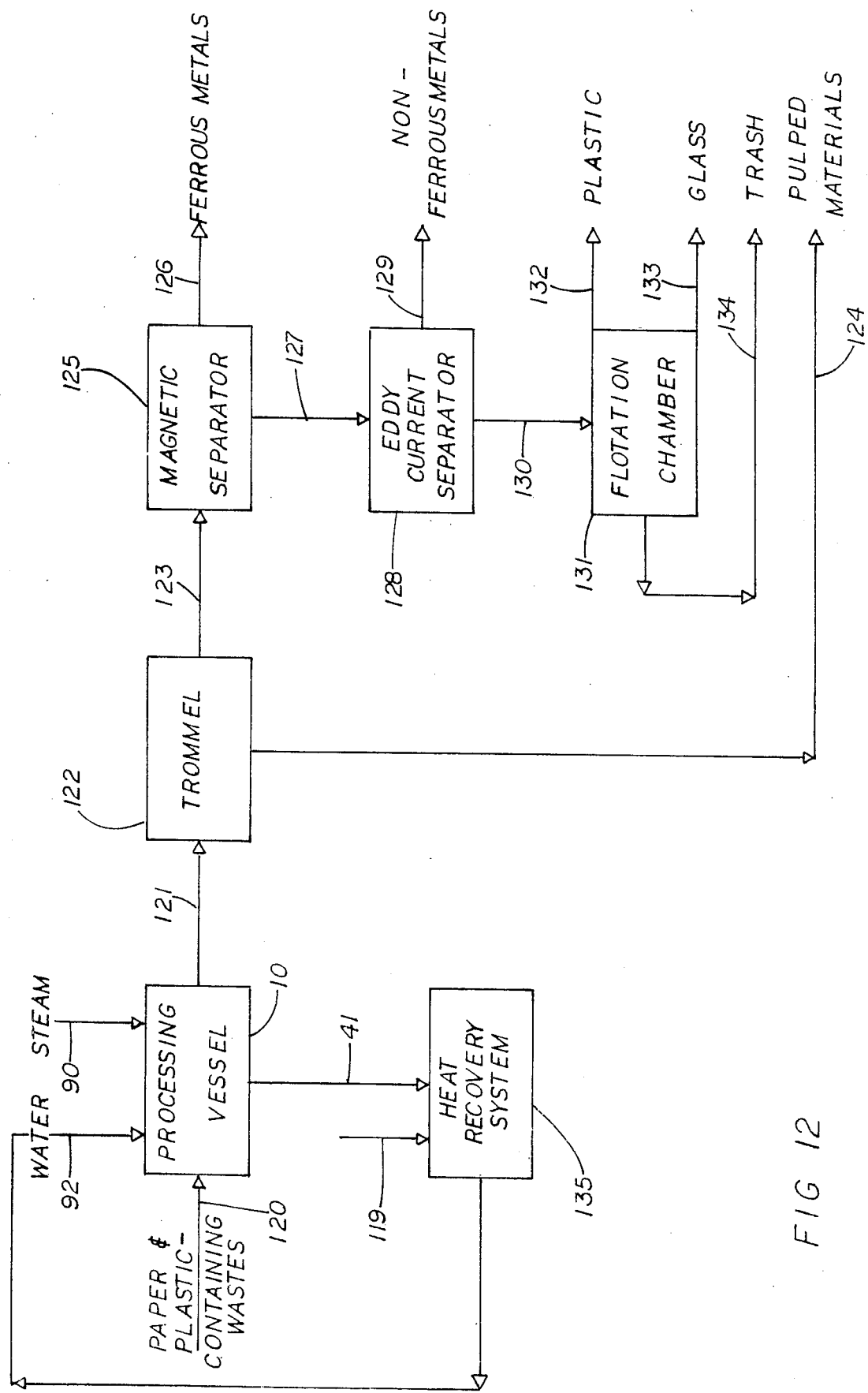
FIG. 12 is a block diagram of the significant components of my device, with direction of flow indicated thereon by the use of arrows.

The water is heated prior to its addition to the vessel by the residual heat of the process which is vented at 41 from the vessel 10 and directed to heat recovery systems 135 for the purpose of pre-heating the necessary additional water; note FIG. 12. Make-up water for the total additional moisture to be added to the system enters the process at the heat recovery system 135.

The filling operation continues until the vessel is filled to approximately 75% of the volumetric capacity of the vessel and the moisture of the mixture has been adjusted to the necessary concentrations. The hydraulic or pneumatic ram assembly 36 is shut off when filling has been completed, and the inlet closure device is closed.

In the processing operation, it is significant to note that the rotation of the vessel 10 is reversed to a second rotative direction, that is, to the direction that accomplishes movement by the directional flighting 80 in the second section of the vessel of the contained materials backward through the vessel, or in other words, toward the inlet. This "reversed" rotative direction is maintained during the processing operation. In that the action of the lifting paddles 70 is independent of the direction of rotation of the vessel 10 but dependent on the angle of incline of the vessel, the lifting paddles 70 will continue to move the contained materials forward through the vessel along the inner periphery, but the helical members 80 force the material along the inner periphery of the vessel toward the inlet end. Simultaneously therewith, there is a rearward counterflow of waste along the approximate centerline of the vessel 10.

The combination of simultaneous forward movement and backward movement of materials and the rotation of materials in the vessel 10 by the rotation of the vessel results in a very advantageous and very complete agitation of the saturated materials in the vessel 10, and by these actions the repulping of the pulpable materials contained in the materials is accomplished.

It was previously mentioned that the rate of rotation of the vessel 10 is dependent upon the amount of agitation needed to accomplish repulping of the pulpable materials in the vessel in a prescribed amount of time. I usually select approximately 4 RPM rate of rotation of the vessel in these assumed conditions. To decrease the amount of time needed to accomplish the repulping of the pulpable materials in the vessel 10, heat is added to the mixture in the vessel. Steam may be advantageously added to the process by piping 90, as previously mentioned, and is distributed to the mixture of materials throughout the vessel 10 by injection piping 96, which accomplishes intimate contact of the mixture of materials with the added heat.

It is to be realized that the vessel 10 is rotated in the second rotative direction, that is, the direction that accomplishes movement by the directional flighting 80 of the contained materials backward through the vessel, during the steam addition. This is to further enhance the contact of the mixture of materials with the added heat, and it should be noted that the amount of steam added to the mixture of materials is determined by the amount of material to be processed in a prescribed amount of time.

The rate of movement of material through the vessel by the helix 80 is dependent on the depth of the helix times the frequency of the helix times the rate of rotation of the vessel.

As previously described, the movement of material through the vessel by the rotation of the vessel and by the lifting paddles 70 is dependent on the angle of incline of the vessel and independent of the direction of rotation of the vessel. The movement of material on the surface of the helix, however, is dependent on the direction of rotation of the vessel.

If the materials to be processed in the vessel are saturated with moisture as previously described, but no steam is added, the time necessary to accomplish repulping of the pulpable materials is 2 to 6 hours.

If the material to be processed is primarily plastic or if plastic recovery is the object of the process, a temperature of 212° F. to 240° F. is accomplished and maintained by maintaining a pressure in the vessel of 15 to 25 psia, resulting in a partial melting and cleaning of the plastic fraction of the plastic and paper-containing waste material in 15 minutes, and little or no repulping of the paper fraction. If a temperature of 240° F. to 285° F. is accomplished and maintained by maintaining a pressure in the vessel of 25 to 50 psia, the repulping of the repulpable materials in the paper and plastic containing waste materials is approximately 1½ hours.

If a temperature of 285° F. to 300° F. is accomplished and maintained by maintaining a pressure of 50 to 70 psia, the repulping of the pulpable materials in paper and plastic-containing waste material is accomplished in approximately 1 hour.

Pressure is maintained in the vessel by injecting steam into the vessel through the piping system 90 and the injection piping system 96 as previously described, and by controlling the venting of the steam from the vessel through the venting system 41 as previously described, while the inlet closure device 40 and the outlet closure device 64 are closed, as previously described.

During the processing operation, the operator need only rotate the vessel in the second rotative direction and typically adjust the pressure controller on the vent system, as previously described, to maintain a predetermined pressure while introducing steam to the injection piping system, as earlier mentioned, and allow the operation to proceed for a predetermined period of time.

Approximately 30% moisture is added to the mixture in the form of condensate during the addition of heat to the mixture of materials. Approximately 0.5% of the moisture of the mixture is flashed into steam and vented through piping 41 to the heat recovery system 135 depicted in FIG. 12 for reuse in the process when the pressure of the system is reduced to 0 PSIG after the processing cycle is complete.

An example of the heat recovery system is a condenser heat exchanger to which the vented steam is directed. The heat exchanger uses water from the system addition water surge tank as the cooling fluid. As the vented steam is condensed, the system addition water absorbs the heat from the vented steam producing hot water to be used in the process.

In that the repulping of the pulpable materials in the vessel 10 results in a reduction in the volume of the pulpable materials in the vessel 10 to approximately 33% of the volume of the incoming materials, the volume of the vessel is filled by a corresponding increase in steam volume added to the vessel during the maintenance of the temperature and the pressure of the vessel and is equal to approximately 10% of the volume of the steam added to the process. This excess steam is vented from the process through vent system 41 and is recovered for reuse in the process in the heat recovery system 135, as was seen in FIG. 12. Variations in the time of processing of waste materials in accordance with this invention involve a selection of the size and number of the lifting paddles, the size and number of the directional flights, the angle of incline of the vessel, the rate of rotation of the vessel, as previously described, and the amount of heat added to the mixture of materials in the vessel and the pressure of the vessel as described above.

When the pulpable materials have been repulped, the steam injection 90 to the system is shut off and the pressure in the vessel 10 is reduced to 0 PSIG through the vent system piping 41. I prefer for the excess process heat to be directed to heat recovery system 135 for reuse in the process. The discharge closure device 64 is opened and the processed material 121 is removed from the vessel 10 by rotating the vessel in the first rotative direction, which of course is the direction that accomplishes forward movement of the processed material through the vessel by the directional flighting (FIGS. 4 and 6) and out of the discharge system 60. The materials are further separated into component fractions by preferably directing the materials to trommel 122, as depicted in FIG. 12.

The rate of discharge of the processed material from the vessel is dependent on the rate of rotation of the vessel 10, the size and the number of the lifting paddles 70, the size and the number of the directional flighting 80, the angle of incline of the vessel 10, and is also determined by the amount of material to be processed in a prescribed amount of time. In this case, the rate of rotation is 3.3 RPM to accomplish the discharge of processed materials in 15 minutes in accordance with the angle of incline of the vessel, the size and the number of lifting paddles, and the size and the number of directional flights, as previously stated.

In accordance with this invention, variations in the rate of discharge of the processed materials, the rate of rotation of the vessel, the angle of incline of the vessel, the size and the number of the lifting paddles and the size and the number of the directional flights will be obvious to those skilled in the art.

Quite advantageously, the processed materials essentially separate into pulped and non-pulped components in the vessel, with the pulped materials being discharged first from the vessel, and the non-pulped materials being discharged last. The pulped product leaving the trommel 122 is a homogeneous cellulosic pulp that is screened away from the non-pulped materials, and is collected as a product 124. The remaining concentrated stream of non-pulped materials 123 is directed to a magnetic separator 125, which separates the ferrous metals from the stream 123, with the ferrous metals then being collected as a product 126.

The remaining non-pulped materials 127 are then directed to aluminum separation means, such as to an eddy-current separator 128, and the aluminum is collected as a product 129. The remaining non-pulped materials are then directed by conveyor 130 to a flotation chamber 131, where plastic is collected from the surface of the flotation chamber as a product 132, and glass is collected from the bottom of the flotation chamber as a product 133. The remaining non-pulped materials are textiles, leather, bits of rubber, splinters of wood etc. regarded as trash and collected at 134, which is of little value. Hence, these are collected and discarded to the landfill.

Other methods and equipment for separation of component fractions from the processed material, such as by the use of trommels and air classification are apparent to those skilled in the art, and these techniques may also be utilized for product recovery.

I claim:

1. An apparatus for preparing paper-containing and plastic-containing waste materials for the separation of component fractions, comprising an elongate pressure vessel of generally cylindrical configuration mounted for rotation about its longitudinal axis, means for selectively driving said vessel in either rotative direction about such longitudinal axis, said vessel having an inlet end and an outlet end, with the longitudinal axis of said vessel being at a slight angle of incline due to said inlet end being at a slightly higher elevation than said outlet end, means for feeding paper-containing and/or plastic-containing waste materials mixed with impurities into said inlet end of said vessel, means for agitating the paper-containing and/or plastic-containing waste materials within the vessel by non-obstructive, non-directional paddles in one portion of said vessel, and helically configured directional flighting in another portion of said vessel, said non-directional paddles and said helically configured directional flighting being mounted at spaced configured directional flighting being mounted at spaced locations along the interior of said vessel, said non-directional paddles extending radially inwardly, toward the longitudinal axis of said vessel, said helically configured directional flighting, during rotation of said vessel in a first rotative direction, intercepting such waste materials, and tending to move same forward, in the direction of said outlet end, whereas during rotation of said vessel in the second rotative direction, the waste material is moved backward by said helically configured means, away from said outlet end of said vessel and toward said inlet end, the backward movement of the waste material by said helically configured means during rotation of the vessel in the second rotative direction, contemporaneous with forward movement of the waste material under the influence of gravity as a consequence of the angle of incline of the rotating vessel resulting, in concert with the agitation provided by said non-directional paddles, in a highly advantageous, very thorough mixing of the waste material, leading to an effective separation of pulped material from non-pulpable material.

2. The apparatus for preparing paper-containing and plastic-containing waste materials for the separation of component fractions, as defined in claim 1, in which said helically configured means is largely confined to the portion of the vessel nearest said outlet end, whereas said non-directional paddles are utilized in the interior of said vessel nearest said inlet end.

3. The apparatus for preparing paper-containing and plastic-containing waste materials for the separation of component fractions, as defined in claim 1 in which means are provided for adding controlled amounts of moisture to the interior of said vessel, such moisture serving to increase the density of the moisture absorptive materials, so that during the mixing procedure, repulping of the moisture-absorptive materials can be accomplished, thereby bringing about size reduction and enhancing the effort involved in separating the materials by size and by density.

4. The apparatus for preparing paper-containing and plastic-containing waste materials for the separation of component fractions, as defined in claim 1 in which said vessel is constructed to withstand internal pressure, and said inlet end and said outlet end can be sealed, whereby the interior of said vessel can be maintained at a pressure above atmospheric pressure during at least a portion of the processing of the waste material.

5. The apparatus for preparing paper-containing and plastic-containing waste materials for the separation of component fractions, as defined in claim 1 in which piping is utilized in connection with said vessel, such that steam can be injected into the interior of said vessel during rotation of said vessel, to enhance the re-pulping process.

6. The apparatus for preparing paper-containing and plastic-containing waste materials for the separation of component fractions, as defined in claim 5 in which the steam injected into said vessel during its rotation brings about a temperature of approximately 227° F. and a pressure of approximately 20 PSIA inside said vessel, to enhance the re-pulping process.

7. The apparatus for preparing paper-containing and plastic-containing waste materials for the separation of component reactions, as defined in claim 5 in which the steam injected into said vessel during its rotation brings about a temperature of approximately 300° F. and a pressure of 50 to 60 PSIA inside said vessel, to enhance the re-pulping process.

8. The apparatus for preparing paper-containing and plastic-containing waste materials for the separation of component fractions, as defined in claim 5 in which means are provided for controlling the pressurized atmosphere in said vessel within operational parameters during times of such steam injection, when said vessel is being driven in rotation.

9. The apparatus for preparing paper-containing and plastic-containing waste materials for the separation of component fractions, as defined in claim 8 in which said means for controlling the pressurized atmosphere in said vessel serves to inject steam when said vessel is being driven in the second rotative direction, said vessel, when caused to rotate again in the first rotative direction, causing the pulped and non-pulped materials, with assistance from said helically configured means, to be discharged from the outlet end of said vessel.

10. The apparatus for preparing paper-containing and plastic-containing waste materials for the separation of component fractions, as defined in claim 1 in which means are provided for effecting selected changes in the angle of inclination of the centerline of said vessel with respect to the horizontal.

11. The apparatus for preparing paper-containing and plastic-containing waste materials for the separation of component fractions, as defined in claim 1 in which power loader means is utilized adjacent said inlet end, so that waste materials can be rapidly forced into the interior of said vessel when said inlet end is open, and the vessel is rotating.

12. An apparatus for preparing paper-containing and plastic-containing waste materials for the separation of component fractions, comprising a pressure vessel of generally cylindrical configuration mounted for rotation about its longitudinal axis, means for selectively driving said vessel in either rotative direction about such longitudinal axis, said vessel having an inlet end and an outlet end, means for feeding paper-containing and/or plastic-containing waste materials mixed with impurities into said inlet end of said vessel, a plurality of non-obstructive agitators mounted at spaced locations along the interior of said vessel, with some of said agitators being non-directional paddles, and others being directional flighting, such that during rotation of said vessel in a first rotative direction, said agitators will intercept said materials, and accomplish a filling of the vessel, said vessel, when caused to rotate in the opposite rotative direction, accomplishing a thorough mixing and a repulping of the pulpable materials after a suitable period of mixing, said directional flighting, when said vessel is caused to rotate again in the first rotative direction, causing the materials to be discharged from said outlet end of said vessel, for separation into distinct components.

13. The apparatus for preparing paper-containing and plastic-containing waste materials for the separation of component fractions as recited in claim 12 in which said pressure vessel is mounted for rotation about an axis inclined at approximately 4° to the horizontal, with said inlet end being higher than said outlet end.

14. The apparatus for preparing paper-containing and plastic-containing waste materials for the separation of component fractions as recited in claim 12 in which means are provided for effecting selected changes in the angle of inclination of the axis of rotation of said vessel with respect to the horizontal.

15. The apparatus for preparing paper-containing and plastic-containing waste materials for the separation of component fractions as recited in claim 14 in which the waste materials are mixed in the second rotative direction of said vessel by the forward movement of the waste materials toward the outlet end of said vessel in accordance with the angle of inclination, the action of gravity, and the action of certain of said agitators, this interaction of factors being further aided by the simultaneous backward movement of the waste materials toward the inlet end of said vessel in accordance with the depth and frequency of agitators in the form of directional flighting, and the speed of rotation of said vessel.

16. The apparatus for preparing paper-containing and plastic-containing waste materials for the separation of component fractions as recited in claim 12 in which said non-directional paddles are disposed adjacent the inlet end of said vessel, and said directional flighting is disposed adjacent the outlet end of said vessel.

17. The apparatus for preparing paper-containing and plastic-containing waste materials for the separation of component fractions as recited in claim 12 in which means are provided for introducing water into the interior of the vessel during its rotation, with such water aiding the procedure of re-pulping the pulpable materials, and the separation of such material from non-pulpable components.

18. The apparatus for preparing paper-containing and plastic-containing waste materials for the separation of component fractions as recited in claim 12 in which means are provided for introducing steam into the interior of said vessel during its rotation, with the injection of steam serving to decrease the time needed for repulping to occur, and enhancing the separation of such material from non-pulpable components.

19. The apparatus for preparing paper-containing and plastic-containing waste materials for the separation of component fractions as recited in claim 18 in which the pressure inside said vessel is significantly increased at the time steam is selectively applied to the interior of said pressure vessel.

20. The apparatus for preparing paper-containing and plastic-containing waste materials for the separation of component fractions as recited in claim 18 in which the injection of steam into the interior of said vessel during its rotation brings about a temperature of approximately 227° F. and a pressure of approximately 20 PSIA inside said vessel, to enhance the re-pulping process.

21. The apparatus for preparing paper-containing and plastic-containing waste materials for the separation of component fractions as recited in claim 18 in which the injection of steam into the interior of said vessel during its rotation brings about a temperature of approximately 300° F. and a pressure of 50 to 60 PSIA inside said vessel, to enhance the re-pulping process.

22. A method for preparing paper-containing and plastic-containing waste materials for the separation of component fractions, utilizing an elongate pressure vessel of generally cylindrical configuration mounted to be driven in rotation about its longitudinal axis, such vessel having an inlet at one end and an outlet at the other end, with a first section of the interior of the vessel containing an array of fixed lifting paddles, and a second section of the interior of the vessel containing a helically configured member, such method comprising the steps of
introducing paper-containing and plastic-containing waste material into the inlet end of the vessel,
driving the vessel in rotation about its longitudinal axis,
agitating the waste material in the vessel by the action of the lifting paddles in the first section, concurrent with rotation of the vessel,
adding moisture to the waste material in the vessel in order to accomplish repulping of the moisture absorptive paper fractions, such that the separation of component fractions by density and by size can thereafter be accomplished,
continuing to rotate the pressure vessel in the presence of the added moisture to enhance separation of component fractions by increasing the density of the moisture absorptive materials, with 55–65% moisture content of the moisture absorptive materials being optimum,
reversing the direction of rotation of the vessel to bring about mixing and reagitation of the materials in the second section of the vessel, and thereafter expelling the treated waste materials from the outlet end of the vessel.

23. The method as recited in claim 22 in which heat is added to the waste material in the vessel to reduce the time required to accomplish repulping.

24. A novel method for preparing paper-containing and plastic-containing waste materials for the separation of component fractions, utilizing an elongate pressure vessel of generally cylindrical configuration mounted to be driven in rotation about its longitudinal axis, such vessel having an inlet at one end and an outlet at the other end, with a first section of the interior of the vessel containing an array of fixed lifting paddles, and a second section of the interior of the vessel containing a helically configured member disposed at a location adjacent the outlet,
such method comprising the steps of
introducing paper-containing and plastic-containing waste material into the inlet end of the vessel,
driving the vessel in rotation about its longitudinal axis in a first direction,
agitating the waste material in the first section of the interior of the vessel by the action of the fixed lifting paddles in concert with the helically configured member during rotation of the vessel,
adding moisture to the waste material in the vessel in order to accomplish repulping of the moisture absorptive paper fractions, such that the separation of component fractions by density and by size can thereafter be accomplished,
rotating the vessel in the second rotative direction in the presence of the added moisture to enhance separation of component fractions by increasing the density of the moisture absorptive materials, with 55–65% moisture content of the moisture absorptive materials being optimum, with the helically configured member located in the second section of the interior of the vessel serving to create a counterflow in the waste material during such rotation of the vessel in the second rotative direction,
and thereafter expelling the treated waste materials from the outlet end of the vessel while rotating the vessel in the first rotative direction, the pulped material being generally discharged first, and the non-pulped material generally last.

25. The method as recited in claim 24 in which heat is added to the waste material in the vessel to reduce the time required to accomplish repulping.

26. A novel method for preparing paper-containing and plastic-containing waste materials for the separation of component fractions, utilizing an elongate pressure vessel of generally cylindrical configuration mounted to be driven in rotation with its longitudinal axis at a slight angle to the horizontal, such vessel having an inlet at one end that is slightly higher than the outlet at the opposite end, with a first section of the interior of the vessel containing an array of fixed lifting paddles, and a second section of the interior of the vessel containing a helically configured member disposed at a location adjacent the outlet,
such method comprising the steps of
introducing paper-containing and plastic-containing waste material into the inlet end of the vessel,
driving the vessel in rotation about its longitudinal axis in a first direction,
initially agitating the waste material in the vessel by the action of the fixed lifting paddles located in the first section of the interior of the vessel during rotation of the vessel,
adding moisture to the waste material in the vessel in order to accomplish repulping of the moisture absorptive paper fractions, such that the separation of component fractions by density and by size can thereafter be accomplished,
rotating the vessel in the second rotative direction in the presence of the added moisture to enhance separation of component fractions by increasing the density of the moisture absorptive materials, with the helically configured member located in the second section of the interior of the vessel serving to create a counterflow with respect to the waste material tending to flow toward the outlet under the influence of gravity, during such rotation of the vessel in the second rotative direction,
and thereafter expelling the treated waste materials from the outlet end of the vessel while rotating the vessel in the first rotative direction, such that the helically configured member can assist in the pulped material being generally discharged first, and the non-pulped material generally last.

27. The method as recited in claim 26 in which heat is added to the waste material in the vessel to reduce the time required to accomplish repulping.

* * * * *